(12) United States Patent
Usui

(10) Patent No.: US 6,373,735 B2
(45) Date of Patent: Apr. 16, 2002

(54) AC-DC CONVERTER WITH REDUCED ENERGY LOSS THROUGH A SWITCHING ELEMENT

(75) Inventor: Hiroshi Usui, Niiza (JP)

(73) Assignee: Sanken Electric Co., Ltd., Saitama-pref. (JP)

( * ) Notice: Subject to any disclaimer, the term of this patent is extended or adjusted under 35 U.S.C. 154(b) by 0 days.

(21) Appl. No.: 09/952,226

(22) Filed: Sep. 13, 2001

(51) Int. Cl.[7] .............................................. H02M 7/68
(52) U.S. Cl. ......................... 363/89; 323/222; 323/283
(58) Field of Search .................. 323/222, 283; 363/89

(56) References Cited

U.S. PATENT DOCUMENTS 4,761,725 A * 8/1988 Henze ........................ 323/222

* cited by examiner

*Primary Examiner*—Shawn Riley
(74) *Attorney, Agent, or Firm*—Bachman & LaPointe, P.C.

(57) ABSTRACT

An AC-DC converter is provided which comprises a booster circuit 9 which has a MOS-FET 6 and a reactor 4 connected in series to MOS-FET 6 for generating a DC output voltage $V_{OUT}$; a voltage generator 11 for providing a reference voltage $V_R$; and a control circuit 10 for comparing reference voltage $V_R$ and DC output voltage $V_{OUT}$ and generating outputs to turn MOS-FET 6 ON and OFF in response to the difference between reference voltage $V_R$ and DC output voltage $V_{OUT}$. The control circuit 10 comprises a voltage detector 18 for measuring an input voltage $V_{IN}$ applied on an input terminal of the reactor 4; and a voltage retainer 22 for keeping output voltage $V_{OUT}$ on a level elevated by a substantially constant voltage $V_P+V_R$ or $V_Z$ above input voltage $V_{IN}$ measured by voltage detector 18 such that booster circuit 9 simply raises input voltage $V_{IN}$, even if on a lower level, by a substantially constant voltage with a smaller step-up ratio $V_{OUT}/V_{IN}$ than that of a case for voltage increase up to a constant high DC output voltage regardless of a level of input voltage $V_{IN}$.

13 Claims, 4 Drawing Sheets

US 6,373,735 B2

AC-DC CONVERTER WITH REDUCED ENERGY LOSS THROUGH A SWITCHING ELEMENT

FIELD OF THE INVENTION

The present invention relates to an AC-DC converter in particular of the type comprising a switching element operated with less power loss and improved AC-DC conversion efficiency under a lower voltage of electric power supplied from an AC power source to the AC-DC converter.

PRIOR ART

A prior art AC-DC converter comprises a rectifying circuit with input terminals connected to an AC power source; a choke coil and a switching transistor connected in series to the rectifying circuit; a diode connected between the choke coil and one of output terminals; an output capacitor connected between the output terminals; dividing resistors connected in parallel to the output capacitor for presenting an output indicating the output voltage level; a power source for producing a reference voltage; an error amplifier for comparing the reference voltage and the output derived from the dividing resistors to produce an output related to a difference between the reference and divided voltages; and a PWM (Pulse Width Modulation) circuit for receiving the output from the error amplifier to generate drive pulses to a gate of the switching transistor. When the PWM circuit generates drive pulses, the switching transistor is turned ON and OFF alternately. During ON period of the switching transistor, electric current flows from the rectifier circuit through the choke coil and the switching transistor to charge the capacitor and store electric energy in the choke coil. During OFF period of the switching transistor, the choke coil discharges the stored electric energy to produce from the output terminals an output voltage raised by the output from the choke coil superimposed on the input voltage charged in the capacitor. When the output voltage is on a lower level, the error amplifier produces a lower level output to generate drive pulses of longer time width to the switching transistor, thereby turning the transistor ON for a longer period of time. Adversely, when the output voltage is on a higher level, the error amplifier produces a higher level output to generate drive pulses of shorter time width to the switching transistor, thereby turning the transistor ON for a shorter period of time, Prior art AC-DC converters are required to keep the output voltage in a substantially constant and elevated level regardless of an input voltage level to the choke coil, and therefore they are driven from high to low step-up ratio of the DC output voltage to the AC input voltage. Specifically, when the input voltage changes between low and high level, they are operated to boost the output voltage to the elevated constant level between high and low step-up ratio in a wide range. When the AC-DC converters are driven to boost the input voltage with high step-up ratio, an excess current flows through the switching transistor, thereby resulting in decrease in AC-DC conversion efficiency and considerable power loss.

An object of the present invention is to provide an AC-DC converter which can prevent an excessive amount of electric current passing through a switching element for longer service duration of the switching element.

Another object of the present invention is to provide an AC-DC converter which indicates less power loss in a switching element with improved AC-DC conversion efficiency under supply of lower voltage electric power.

SUMMARY OF THE INVENTION

The AC-DC converter according to the present invention is provided with a booster circuit (9) which comprises a switching element (6) and a reactor (4) connected in series to the switching element (6) so that ON and OFF operation of the switching element (6) accumulates electric energy in the reactor (4) and discharges the electric energy from the reactor (4) to generate a DC voltage ($V_{OUT}$) above an AC voltage ($V_{IN}$) supplied from an AC power source (1). The converter also is equipped with a control circuit (10) which comprises potential means (11) for providing a reference voltage ($V_R$); means (30) for comparing the reference voltage ($V_R$) and DC output voltage ($V_{OUT}$) and generating drive signals ($V_G$) to turn the switching element (6) ON and OFF in response to the difference between the reference voltage ($V_R$) and DC output voltage ($V_{OUT}$); a voltage detector (18) for measuring an input voltage ($V_{IN}$) applied on an input terminal of the reactor (4); and a voltage retainer (22) for maintaining the output voltage ($V_{OUT}$) above the input voltage ($V_{IN}$) measured in the voltage detector (18) by a substantially constant voltage.

Comparing the reference voltage ($V_R$) and DC output voltage ($V_{OUT}$), the control circuit (10) generates drive pulses ($V_G$) for turning the switching element (6) ON or OFF to shorten or lengthen ON period of the switching element (6) when the output voltage ($V_{OUT}$) is higher or lower respectively to reduce or increase the output voltage ($V_{OUT}$). Also, as the voltage retainer (22) keeps the output voltage ($V_{OUT}$) above the input voltage ($V_{IN}$) measured in the voltage detector (18) by a substantially constant voltage ($V_P+V_R$ or $V_Z$), the booster circuit (9) simply raises the input voltage ($V_{IN}$) by the substantially constant voltage ($V_P+V_R$ or $V_Z$). This means that the step-up ratio ($V_{OUT}/V_{IN}$) is smaller than that of a prior art converter for boosting the input voltage ($V_{IN}$) up to a constant high DC output voltage regardless of a level of the input voltage ($V_{IN}$). Accordingly, the converter according to the present invention may change the output voltage ($V_{OUT}$) in a linear and ramp characteristic, whereas the prior art converter produces the output voltage of a fixed level with the changing step-up ratio ($V_{OUT}/V_{IN}$) in a wide range. The small step-up ratio ($V_{OUT}/V_{IN}$) causes less change in ON period of the switching element (6) and less amount of electric current ($I_{DS}$) through the switching element (6) with reduction of power loss in the switching element (6) and improved AC-DC conversion efficiency.

BRIEF DESCRIPTION OF THE DRAWINGS

These as well as other objects of the present invention will become apparent during the course of the following description with reference to the accompanying drawings, in which.

DETAILED DESCRIPTION OF THE INVENTION

Figure 1:
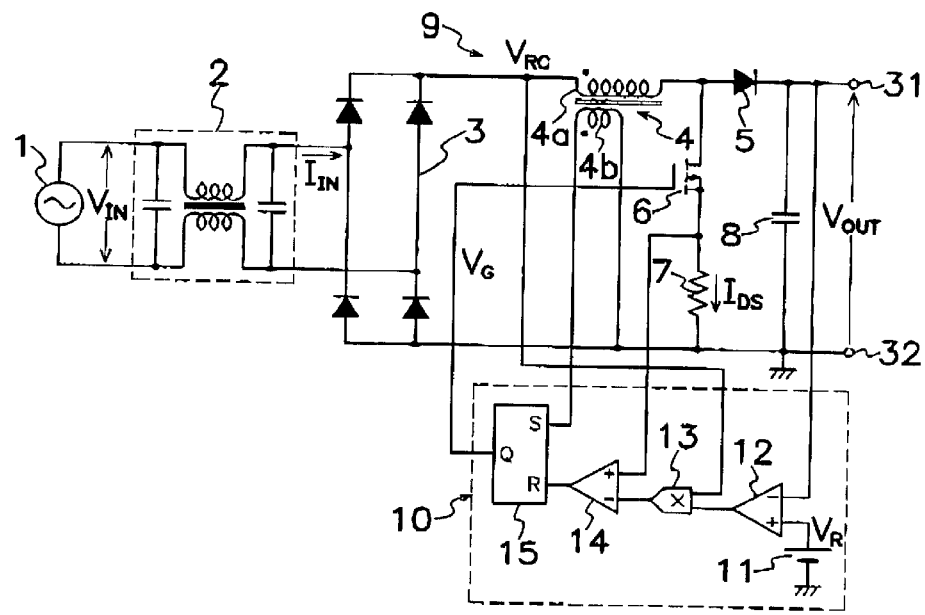
FIG. 1 is an electric circuit diagram of a prior art AC-DC converter.

Referring now to the accompanying drawings, FIG. 1 illustrates a prior art AC-DC converter which comprises a filter circuit 2 connected to an AC power source 1 for producing AC input voltage $V_{IN}$; a booster circuit 9 for raising AC input voltage $V_{IN}$ to an elevated output voltage $V_{OUT}$; and a control circuit 10 for generating drive pulses $V_G$ to operate the booster circuit 9. Booster circuit 9 comprises a reactor 4 including primary and secondary windings 4a, 4b electro-magnetically connected to each other; a rectifying circuit or diode bridge 3 for full wave rectification connected to filter circuit 2 for supplying rectified DC output to reactor 4; a switching element or MOS-FET (Field Effect Transistor of Metal Oxide Semiconductor) 6 connected between primary winding 4a of reactor 4 and diode bridge 3; a smoothing capacitor 8 connected between a pair of output terminals 31, 32; a rectifier diode 5 connected between primary winding 4a of reactor 4 and smoothing capacitor 8; and a detective resistor 7 connected to MOS-FET 6 and diode bridge 3. Primary winding 4a is connected between a positive terminal of rectifying circuit 3 and an anode of rectifier diode 5, and secondary winding 4b is connected between a negative terminal of diode bridge 3 and control circuit 10. Detective resistor 7 is connected in series to one of two main terminals, e.g. a drain of MOS-FET 6 for detecting a voltage corresponding to a level of electric current $I_{DS}$ through MOS-FET 6.

Control circuit 10 comprises potential means or a voltage generator 11 for generating a reference voltage $V_R$; a differential or error amplifier 12 for comparing output voltage $V_{OUT}$ of smoothing capacitor 8 with reference voltage $V_R$ of voltage generator 11 to generate an amplified differential voltage; and a drive signal generator 30 for producing drive signals $V_G$ to a control terminal or gate of MOS-FET 6 based on comparative outputs from comparator 12. Error amplifier 12 has an inverted terminal connected to output terminal 31 and a non-inverted terminal connected to voltage generator 11. Drive signal generator 30 comprises a multiplier 13 for multiplying amplified differential voltage from error amplifier 12 and a rectified voltage $V_{RC}$ of diode bridge 3 to produce a multiplied output; a comparator 14 for comparing multiplied output from multiplier 13 with a maximal voltage applied on detective resistor 7; and a R-S flip-flop 15 which contains a set terminal S for receiving an induced voltage from second winding 4b, a reset terminal R for receiving output signals from comparator 14 and an output terminal Q for generating drive signals $V_G$ to gate of MOS-FET 6. Comparator 14 has a non-inverted terminal connected between MOS-FET 6 and resistor 7, and an inverted terminal connected to multiplier 13. Drive signal generator 30 produces drive signals $V_G$ to gate of MOS-FET 6 in response to differential output voltage from error amplifier 12.

In operation, AC electric power from AC power source 1 is converted through filter circuit 2 and diode bridge 3 into DC electric power supplied to booster circuit 9. Electric current flows through diode bridge 3, a primary winding 4a of reactor 4 and diode 5 to capacitor 8 to charge capacitor 8. When R-S flip-flop 15 is switched to "SET" condition by a trigger circuit not shown, it produces an initial drive signal $V_G$ from output terminal Q to MOS-FET 6 to turn it ON, and electric current flows from diode bridge 3 through primary winding 4a, MOS-FET 6 and detective resistor 7 to accumulate electric energy in reactor 4 and simultaneously to charge smoothing capacitor 8 to rectified voltage $V_{RC}$ of diode bridge 3. When drive pulse $V_G$ from R-S flip-flop 15 is terminated, MOS-FET 6 is turned OFF and reactor 4 discharges accumulated energy to cause electric current to flow from primary winding 4a of reactor 4 through output diode 5 to an external electric machine connected to output terminals 31 and 32. Comparing reference voltage $V_R$ and DC output voltage $V_{OUT}$, control circuit 10 produces drive pulses $V_G$ to turn MOS-FET 6 ON and OFF, shortening or lengthening ON period of MOS-FET 6 when output voltage $V_{OUT}$ is higher or lower respectively to reduce or increase output voltage $V_{OUT}$, and therefore, booster circuit 9 produces output voltage $V_{OUT}$ from output terminals 31 and 32 above input voltage $V_{IN}$ supplied from AC power source 1 because primary winding 4a discharges electric energy to generate electric current which provides an output voltage derived from primary winding 4a and superimposed on rectified voltage $V_{RC}$ charged in capacitor 8 to produce elevated output voltage $V_{OUT}$ 1. When reactor 4 finishes discharging energy, second winding 4b induces a voltage which is then applied to set terminal S of R-S flip-flop 15, and it is turned into "SET" condition so that output terminal Q produces drive signals $V_G$ of high level to gate of MOS-FET 6 to turn it ON.

During operation, error amplifier 12 compares output voltage $V_{OUT}$ through output terminals 31, 32 with reference voltage $V_R$ of voltage generator 11 to produce amplified output from error amplifier 12 relative to difference between reference voltage $V_R$ and DC output voltage $V_{OUT}$. Multiplier 13 performs multiplication of amplified differential voltage from error amplifier 12 and rectified voltage $V_{RC}$ of diode bridge 3 to produce a multiplied output as a reference voltage to comparator 14 relative to AC input voltage. Then, comparator 14 compares maximal voltage of detective resistor 7 with multiplied output from multiplier 18, and produces output signals when an over-current flows through detective resistor 7 causing maximal voltage of detective resistor 7 higher than multiplied output. When output signal from comparator 14 is applied to reset terminal R, R-S flip-flop 15 is turned to "RESET" condition to produce drive signals $V_G$ of low level from output terminal Q to gate of MOS-FET 6 which is then turned OFF. Comparator 14 can serve to increase input power factor to approximately 1.0 because instantaneous change of AC input current $I_N$ follows instantaneous change of AC input voltage $V_{IN}$. In this way, as set terminal S and reset terminal R of R-S flip-flop 15 respectively and alternately receive induced voltage from second winding 4b of reactor 4, and output signal from comparator 14, output terminal Q forwards drive signals $V_G$ of high and low levels to gate of MOS-PET 6 which therefore is alternately turned ON and OFF.

In a usual worldwide practice, AC-DC converter is designed to generally produce a constant output voltage $V_{OUT}$ of about 380 volts by boosting an AC input voltage $V_{IN}$ of 85 to 265 volts through AC-DC converter. For that reason, control circuit 10 is provided with a voltage generator 11 of reference voltage $V_R$ kept on about 380 volts so that a step-up ratio $V_{OUT}/V_{IN}$ of DC output voltage $V_{OUT}$ to AC input voltage $V_{IN}$ varies from 4.47 (=380/85) to 1.43 (=380/265) between lowest and highest levels of about 85 volts and about 265 volts of AC input voltage $V_{IN}$. This means that the converter is required to change the step-up ratio $V_{OUT}/V_{IN}$ over three times upon the lowest level, compared with the highest level of AC input voltage $V_{IN}$. When AC input voltage $V_{IN}$ is lower, AC-DC converter is required to boost AC input voltage $V_{IN}$ with extremely high step-up ratio $V_{OUT}/V_{IN}$ of above 4 so that excess electric current flows through MOS-FET 6, thereby resulting in deterioration of conversion efficiency and increase of power loss in MOS-FET 6.

FIGS. 2 to 7 illustrate preferred embodiments of AC-DC converter according to the present invention wherein same reference symbols are used in FIGS. 2, 4, 6 and 7 to indicate substantially similar components as those shown in FIG. 1, and to avoid the repeated description.

Figure 2:
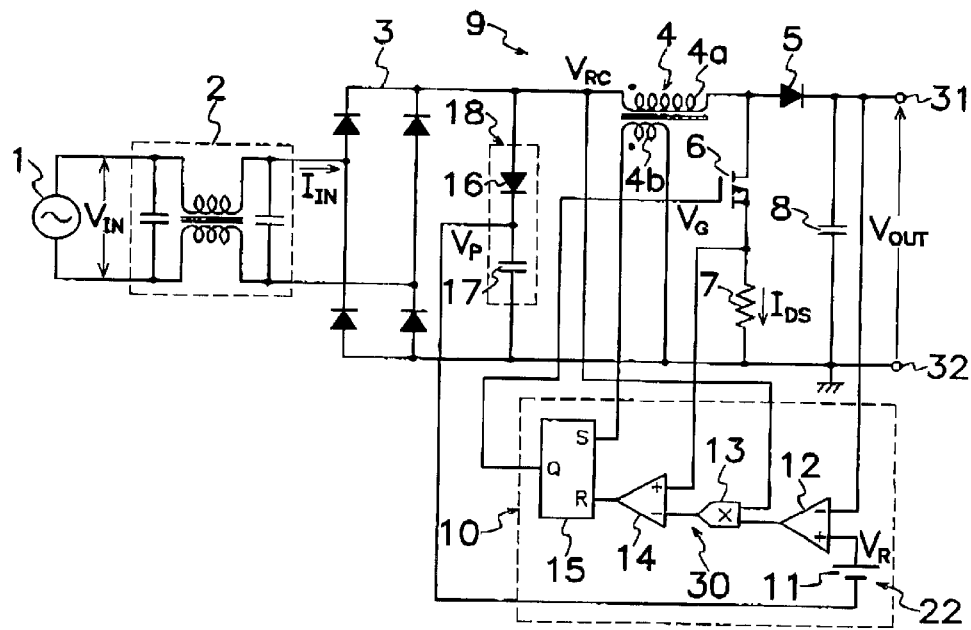
FIG. 2 is an electric circuit diagram showing a preferred embodiment of an AC-DC converter according to the present invention.

As shown in FIG. 2, the control circuit 10 of AC-DC converter according to the present invention, comprises a voltage detector 18 for measuring input voltage $V_{RC}$ or rectified voltage $V_{RC}$ applied on an input terminal of reactor 4; and a voltage retainer 22 for keeping output voltage $V_{OUT}$ above input voltage $V_{IN}$ by a substantially constant voltage $V_R$. For example, the voltage detector 18 discerns a peak $V_P$ of input voltage $V_{IN}$ wherein peak input voltage $V_{IN}$, peak rectified voltage $V_{RC}$ and peak voltage $V_P$ are approximately equivalent to each other ($V_{IN}=V_{RC}=V_P$). Connected between two terminals of diode bridge rectifier 3 is the voltage detector 18 that comprises a rectifier diode 16 for preventing backflow and a capacitor 17 connected in series to rectifier diode 16 to charge the capacitor 17 to a peak level of input voltage $V_{IN}$. Voltage detector 18 has an output terminal formed by an intermediate point between rectifier diode 16 and capacitor 17, and voltage retainer 22 connects output terminal of voltage detector 18 in series to a negative terminal of voltage generator 11 to superimpose output $V_P$ from voltage detector 18 on reference voltage $V_R$ and thereby to provide a total reference voltage $V_S$ indicative of a sum of input voltage $V_{IN}$ of voltage detector 18 and reference voltage $V_R$ of voltage generator 11. In other words, voltage retainer 22 adds output voltage $V_P$ from voltage detector 18 to reference voltage $V_R$ to maintain output voltage $V_{OUT}$ on a voltage level elevated by a constant level $V_R$ above input voltage $V_{IN}$. In this embodiment, AC power source 1 produces AC input voltage $V_{IN}$ to diode bridge 3 for fall wave rectification to generate input voltage $V_{IN}$ which brings forth electric current flowing through rectifier diode 16 and capacitor 17 of voltage detector 18 to charge capacitor 17 to the peak voltage $V_P$ of rectified voltage $V_{RC}$. Total reference voltage $V_S$ for error amplifier 12 is given by a sum of reference voltage $V_R$ and detected peak voltage $V_P$ to produce output voltage $V_{OUT}$ in reduced step-up ratio $V_{OUT}/V_{IN}$ even when AC input voltage $V_{IN}$ is on the lower level. Accordingly, when AC input voltage $V_{IN}$ is on the lower level, the AC-DC converter can reduce the power loss generated in MOS-FET 6 with improved conversion with reduction of electric current $I_{DS}$ through MOS-FET 6. Capacitor 17 can be charged up to peak voltage $V_P$ of AC input voltage $V_{IN}$ through diode bridge 3 and rectifier diode 16 of voltage detector 18 to add peak voltage $V_P$ to reference voltage $V_R$ by a simple circuit variation, thereby resulting in the summed total reference voltage $V_S$.

Figure 3:
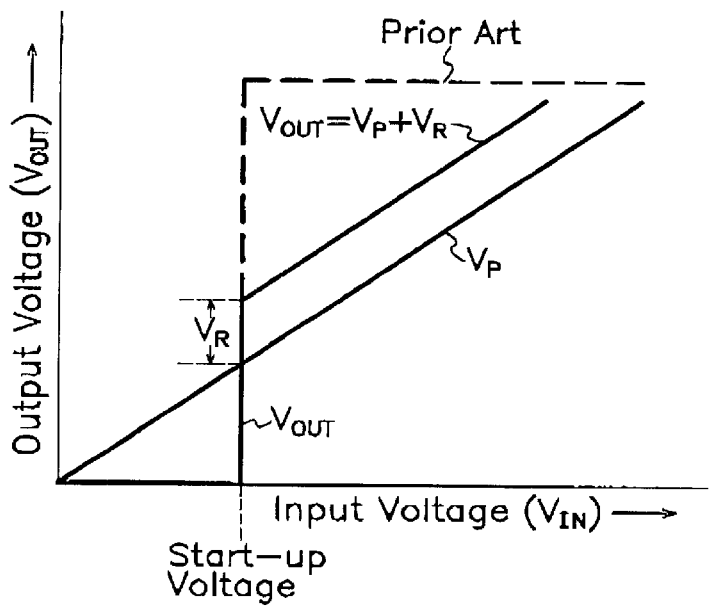
FIG. 3 is a graph indicating an output voltage variation of the electric circuit shown in FIG. 2 relative to an input voltage variation.

A solid line in FIG. 3 shows a ramp property of output voltage $V_{OUT}$ varying with change of input voltage $V_{IN}$ in an area above the start-up voltage while a prior art converter produces a constant output voltage as shown by a dotted line in FIG. 3. Accordingly, even if input voltage $V_{IN}$ is on a lower level, booster circuit 9 simply raises input voltage $V_{IN}$ by substantially constant level $V_R$ so that small step-up ratio $V_{OUT}/V_{IN}$ causes less change in ON period of time for MOS-FET 6 and less amount of electric current $I_{DS}$ through MOS-FET 6 to reduce power loss in MOS-FET 6 and improve AC-DC conversion efficiency by means of a simple construction for connecting output terminal of voltage detector 18 in series to voltage generator 11.

For example, when voltage generator 11 provides a reference voltage $V_R$ of 50 volts, and AC power source 1 supplies an effective value $V_{IN}$ of AC 100 volts, voltage detector 18 perceives a peak voltage $V_P$ of 141 volts in input voltage $V_{IN}$ to control and maintain output voltage $V_{OUT}$ on total voltage $V_S$ of 191 volts ($V_S=V_P+V_R$) with step-up ratio $V_{OUT}/V_{IN}$ of 1.91. On the other hand, with AC input voltage $V_{IN}$ of effective value 265 volts and detected voltage $V_P$ of 374 volts, output voltage $V_{OUT}$ is controlled to total 424 volts in step-up ratio $V_{OUT}/V_{IN}$ of 1.60. In this way, when AC input voltage $V_{IN}$ is lower, booster circuit 9 simply produces output voltage $V_{OUT}$ of lower level than that of conventional AC-DC converter shown in FIG. 1 so that step-up ratio $V_{OUT}/V_{IN}$ in the instant invention can be reduced. Further description on FIG. 1 is omitted because the AC-DC converter of this embodiment has its basic operation fully similar to that of AC-DC converter shown in FIG. 1. Also, total voltage $V_S$ may be calculated without forward voltage drop, for example, 0.5 volt of rectifier diode 16 because it is negligibly low, compared with total voltage $V_S$.

Figure 4:
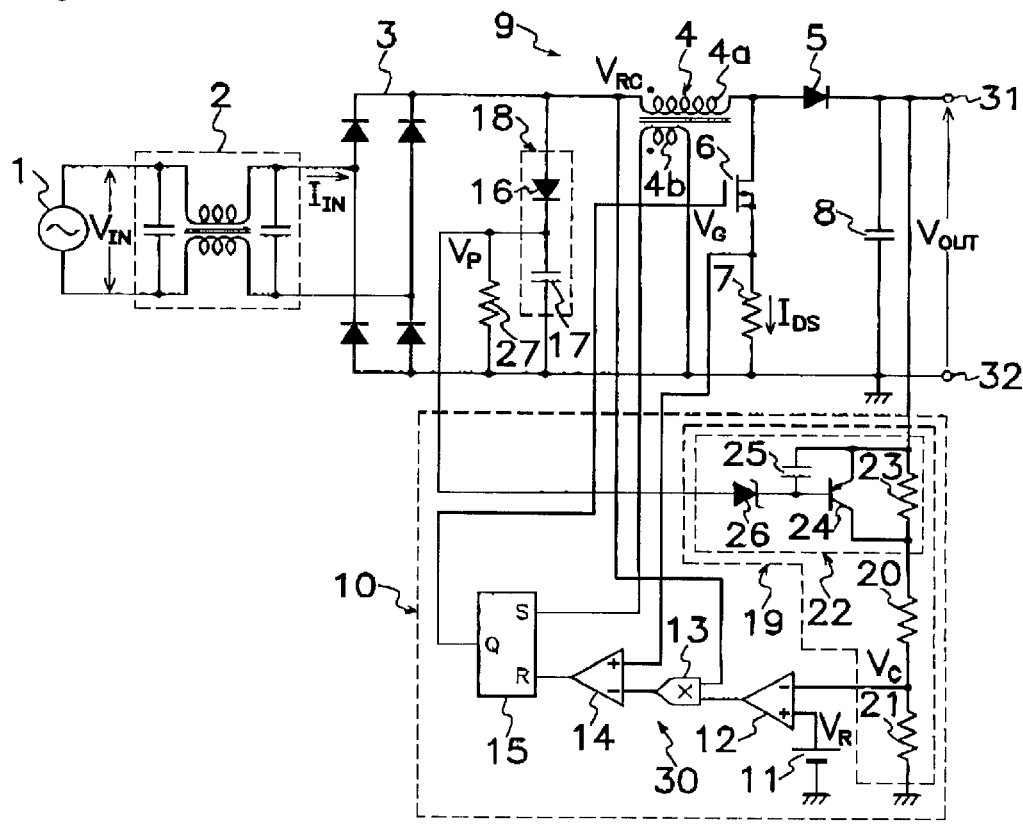
FIG. 4 is an electric circuit diagram showing a second embodiment of the present invention.

A second embodiment of the present invention shown in FIG. 4 includes a voltage retainer 22 which comprises a regulating circuit 19 for maintaining output voltage $V_{OUT}$ on a level elevated by at least a constant voltage $V_Z$ above input voltage $V_{IN}$ generated by a voltage detector 18 with a discharge resistor 27 connected in parallel to capacitor 17. Regulating circuit 19 comprises a regulating element or Zener diode 26 connected to output terminal of voltage detector 18; a series resistor 23 and voltage dividing resistors 20, 21 connected between an output terminal of booster circuit 9 and earth; and an adjusting element or PNP type transistor 24 connected in parallel to resistor 23 to supply outputs of Zener diode 26 to a control terminal or base of transistor 24. Transistor 24 has a collector and an emitter connected to both ends of series resistor 28, and base connected between rectifier diode 16 and capacitor 17 through Zener diode 28 to supply outputs of voltage detector 18 to base of transistor 24. A start-up capacitor 25 is connected between emitter and base of transistor 24 to adjust starting voltage.

Neglecting a small forward voltage drop across rectifier diode 16, peak voltage $V_P$ is generally equal to peak voltage of AC input voltage $V_{IN}$, and is applied through Zener diode 26 to base of transistor 24. With Zener voltage of 50 volts across diode 26 and detected voltage $V_P$ lower than 50 volts, no electric current flows through base of transistor 24 which accordingly is kept in the OFF condition. When detected voltage $V_P$ is increased above 50 volts, electric current flows through base of transistor 24 which is turned ON so that impedance between emitter and collector of transistor 24 varies relative to level of detected voltage $V_P$ to thereby adjust picked voltage $V_C$ applied on lower resistor 21 due to change in impedance of transistor 24. Error amplifier 12 detects picked voltage $V_C$ indicative of output voltage $V_{OUT}$ to output terminals 31, 32 and compares it with reference voltage $V_R$ of voltage generator 11 to produce a differential output like the conventional AC-DC converter shown in FIG. 1. Control circuit 10 produces drive signals $V_G$ to turn MOS-FET 6 ON and OFF in order to allow level of divided voltage $V_C$ to generally equal to reference voltage $V_R$. Also, at the time of starting AC-DC converter, start-up capacitor 25 is charged to charged voltage in smoothing capacitor 8 to turn transistor 24 ON immediately when detected voltage $V_P$ is increased above 50 volts thereby maintaining divided voltage $V_C$ on a lower level. This attains widening of ON pulse width of drive signals $V_G$ from control circuit 10 to extend ON period of MOS-FET 6 for the elongated on-duty. Thus, voltage retainer 22 serves to maintain output voltage $V_{OUT}$ on summed voltage $V_S$ of input voltage $V_{IN}$ or detected voltage $V_P$ of voltage detector 18 plus reference voltage $V_R$ of voltage generator 11 with a smaller step-up ratio $V_{OUT}/V_{IN}$ than that of a prior art converter for boosting input voltage $V_{IN}$ up to a constant high DC output voltage regardless of a level of input voltage $V_{IN}$.

Figure 5:
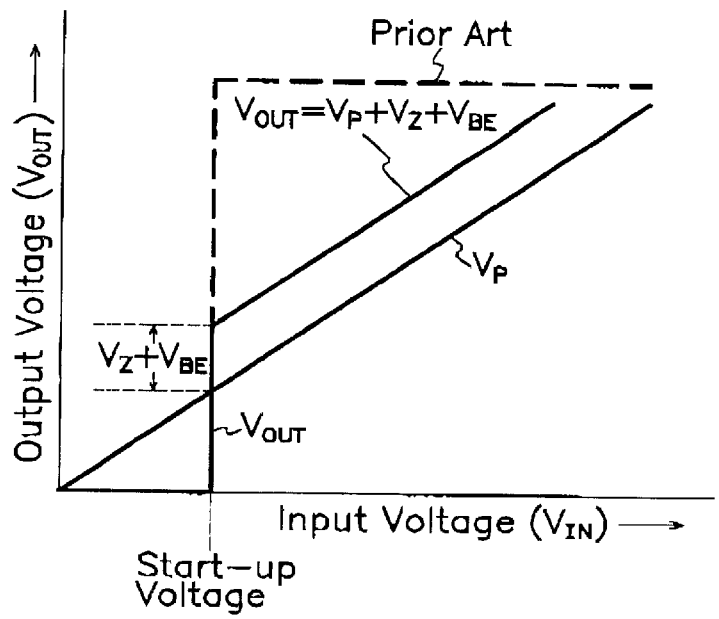
FIG. 5 is a graph indicating an output voltage variation of the electric circuit shown in FIG. 4 relative to an input voltage variation.

In operation, electric current flows through transistor 24 and Zener diode 26 under output voltage $V_{OUT}$, and amount of the electric current increases with drop of input voltage $V_{IN}$ so that impedance in transistor 24 is reduced, narrowing the potential difference between two main terminals, namely emitter and collector of transistor 24. Adversely, amount of the electric current flowing through transistor 24 and Zener diode 26 decreases with rise of input voltage $V_{IN}$ so that impedance in transistor 24 is increased, widening the potential difference between emitter and collector of transistor 24 to maintain electric current through voltage dividing resistors 20, 21 constant. Thus, output voltage $V_{OUT}$ can be retained on a level above input voltage $V_{IN}$ by substantially constant voltage $V_Z$ plus voltage drop $V_{BE}$ between base and emitter of transistor 24, and accordingly regulating circuit 19 maintains output voltage $V_{OUT}$ on summed level $V_S$ of input voltage $V_{IN}$, Zener voltage $V_Z$ of Zener diode 26 and voltage drop $V_{BE}$ across base and emitter of transistor 26 as shown in FIG. 5. In this case, as voltage drop $V_{BE}$ across base and emitter of transistor 26 is a negligibly small amount of about 0.7 volt, output voltage $V_{OUT}$ is maintained on summed level of input voltage $V_{IN}$ plus Zener voltage $V_Z$ of Zener diode 26. Consequently, in the second embodiment shown in FIG. 4, booster circuit 9 simply raises DC output voltage $V_{OUT}$ on an elevated level by substantially constant voltage $V_Z$ with a smaller step-up ratio $V_{OUT}/V_{IN}$ than that for prior art voltage increase up to a constant high DC output voltage regardless of a level of input voltage $V_{IN}$. When output voltage $V_{OUT}$ is higher than reference voltage $V_R$, control circuit 10 produces drive signals $V_G$ for shortening ON period of time for MOS-FET 6 to reduce output voltage $V_{OUT}$. Specifically, resistor 23 connected in parallel to transistor 24 provides an aligning circuit for maintaining output voltage $V_{OUT}$ on a predetermined value shown by the following formula:

$$V_{OUT} = \{(R_{20}+R_{21}+R_{23})/R_{21}\} \cdot V_X$$

wherein $R_{20}$, $R_{21}$ and $R_{23}$ indicate resistance values of resistors 20, 21 and 23, and $V_X$ indicates a value of reference voltage $V_R$ of voltage generator 11 or picked voltage $V_C$ of regulating circuit 19 so that aligning circuit or resistor 23 in operation serves to prevent output voltage $V_{OUT}$ from unnecessarily rising beyond an upper voltage limit. In this way, picked voltage $V_C$ in regulating circuit 19 of the embodiment shown in FIG. 4 can be used to adjust output voltage $V_{OUT}$ in response to peak voltage $V_P$ of voltage detector 18 in order to maintain output voltage $V_{OUT}$ on lower level when AC input voltage $V_{IN}$ is on lower level.

Figure 6:
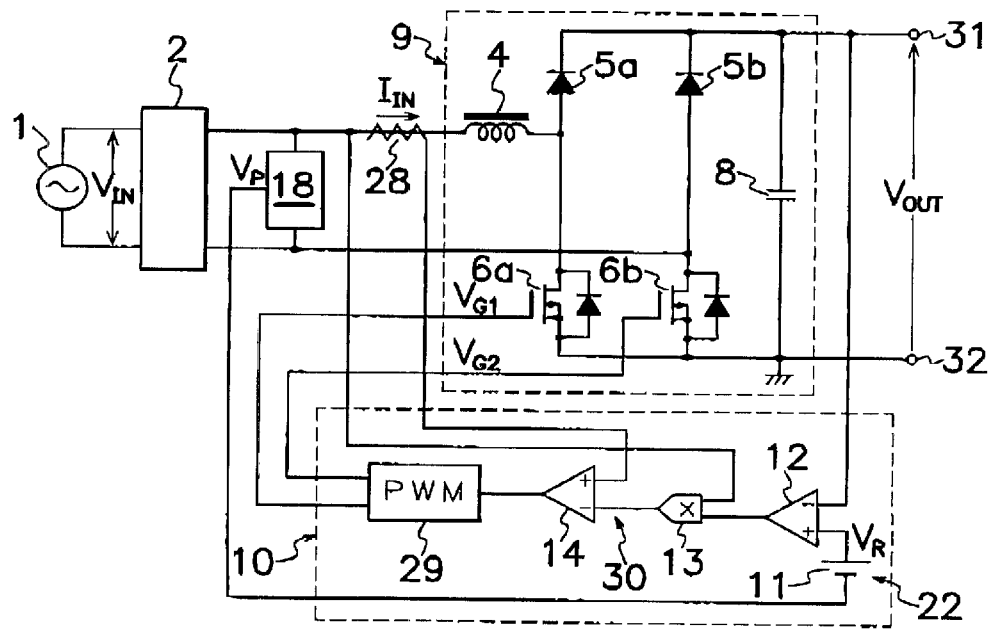
FIG. 6 is an electric circuit diagram showing a third embodiment of the present invention.

FIG. 6 demonstrates a third embodiment according to the present invention utilizing a booster circuit 9 which comprises a pair of output diodes 5a, 5b connected in parallel to each other and to a positive output terminal 31; a pair of two MOS-FETs 6a, 6b connected in parallel to each other and between negative output terminal 32 and output diodes 5a, 5b respectively. A reactor 4 is connected between a positive output of filter circuit 2 and output diode 5a, and a negative output of filter circuit 2 is connected to MOS-FET 6b. Provided on a line between filter circuit 2 and reactor 4 is a current detector 28 which discerns a value of electric current through reactor 4 and forwards the value to comparator 14 whose output is supplied to a PWM circuit 29 for generating drive signals $V_{G1}$ and $V_{G2}$ to each gate of MOS-FETs 6a, 6b.

Figure 7:
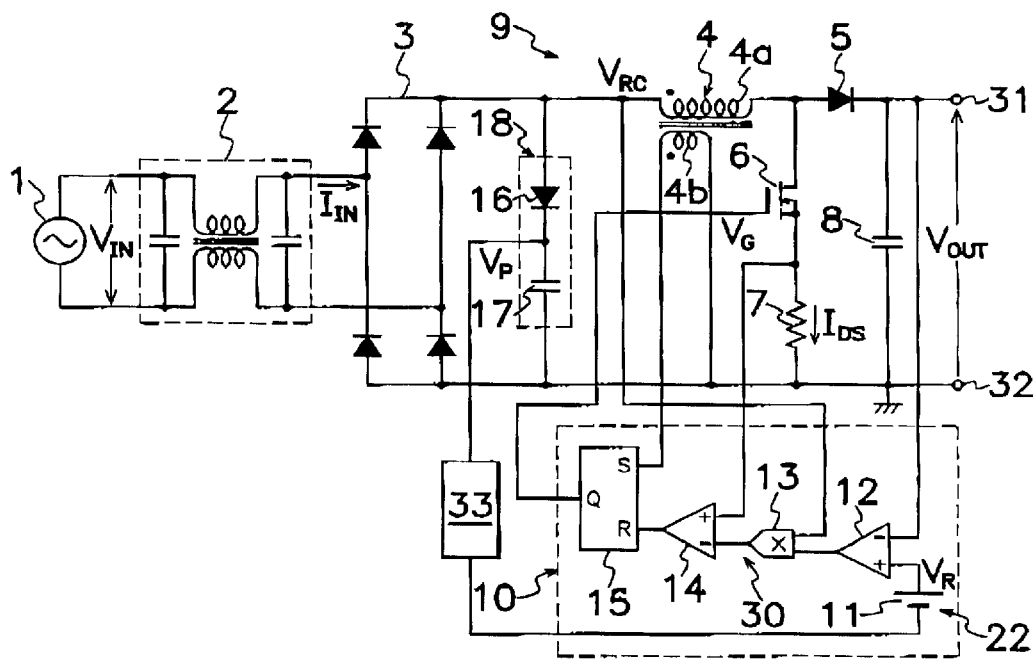
FIG. 7 is an electric circuit diagram of a fourth embodiment modified from the first embodiment shown in FIG. 2.

As shown in FIG. 7, AC-DC converter may comprises a biasing circuit 33 for increasing reference voltage $V_R$ on which peak voltage $V_P$ of voltage detector 18 is superimposed to extend ON period in an ON-OFF cycle of MOS-FET(s) 6 for elevation of output voltage $V_{OUT}$ at the time of starting AC-DC converter, thereby eliminating ripple components or fluctuation involved in output voltage $V_{OUT}$.

Voltage dividing resistors 20, 21 are operated to share output voltage $V_{OUT}$ with upper and lower resistors 20, 21 so that an inverted terminal of error amplifier 12 picks out a divided voltage $V_C$ applied on lower resistor 21. Voltage regulator 22 adjusts divided voltage $V_C$ applied on lower resistor 21 in response to peak voltage $V_P$ through voltage detector 18.

Accordingly, AC-DC converter shown in FIG. 4 can reduce power loss in MOS-FET 6 with the improved conversion efficiency because reduced step-up ratio $V_{OUT}/V_{IN}$ decreases electric current $I_{DS}$ through MOS-PET 6. At the time of starting AC-DO converter, picked voltage $V_C$ can be kept on lower level by voltage charged in starting capacitor 25 to expand ON pulse width of drive signals $V_G$ to MOS-FET 6 so that level of output voltage $V_{OUT}$ can be immediately increased, restricting occurrence of ripple components in output voltage $V_{OUT}$ from booster circuit 9 to an external DC power supply such as DC-DC converter connected to output terminals 31, 32 in starting AC-DC converter. A similar operation can be obtained with series resistor 23 of voltage regulator 22 connected between voltage dividing resistor 21 and earth as a variation of the embodiment shown in FIG. 4.

The present invention is not limited to the foregoing embodiments, and more various kinds of variations in the embodiments can be made. For example, the AC-DC converter according to the present invention may perceive effective or average values of AC input voltage $V_{IN}$ in lieu of peak voltage $V_P$ of AC input voltage $V_{IN}$ detected by voltage detector 18.

Also, the AC-DC converter may include voltage limiting means such as a limiter circuit provided in control circuit 10 for restricting output voltage $V_{OUT}$ across booster circuit 9 up to a predetermined value to advantageously prevent considerable increase of output voltage $V_{OUT}$ when AC input voltage $V_{IN}$ supplied from AC power source 1 reaches a maximum rating value. The converter does not necessarily maintain a constant step-up ratio $V_{OUT}/V_{IN}$, and step-up ratio $V_{OUT}/V_{IN}$ may be varied depending on level of AC input voltage $V_{IN}$ of AC power source 1. In lieu of MOS-FET 6, a switching semiconductor of another type may be selected from an IGBT (insulated gate type bipolar transistor), a J-FET (junction type field effect transistor), a junction type bipolar transistor and a thyristor. Also, it is apparent that the present invention can be applied to AC-DC converters of three-phase or polyphase alternating current type as well as single-phase alternating current type.

As mentioned above, the AC-DC converter according to the present invention can control step-up ratio to the lower level to boost the output voltage to a higher level than the AC voltage of the AC power source by a substantially constant height. Therefore, the converter can achieve decrease in electric current through the switching element with reduction of the power loss and improvement of the conversion efficiency for the voltage of worldwide AC power source when the voltage supplied from the AC power source is lower.

What is claimed are:

1. An AC-DC converter comprising a booster circuit which has a switching element and a reactor connected in series to said switching element for generating a DC output voltage, said reactor accumulating and discharging electric energy by ON and OFF operation of said switching element to generate the DC voltage above an AC voltage supplied from an AC power source;

a control circuit comprising:

potential means for providing a reference voltage;

means for comparing the reference voltage and DC output voltage and generating drive signals to turn said switching element ON and OFF in response to the difference between the reference voltage and DC output voltage;

a voltage detector for measuring an input voltage applied on an input terminal of said reactor; and a voltage retainer for maintaining said output voltage above said input voltage measured in said voltage detector by a substantially constant voltage.

2. The AC-DC converter of claim 1, wherein said voltage retainer adds said input voltage measured by said voltage detector to said reference voltage to maintain said output voltage on a voltage elevated by a constant level above the input voltage.

3. The AC-DC converter of claim 2, wherein said voltage retainer connects an output terminal of said voltage detector in series to said potential means to provide a total reference voltage as a sum of the input voltage of the voltage detector and reference voltage of said potential means, said control circuit comprising a comparator for comparing the reference voltage and DC output voltage to produce comparative outputs; and a drive signal generator for producing drive signals to a control terminal of the switching element based on the comparative outputs from said comparator.

4. The AC-DC converter of claim 1, wherein said voltage retainer comprises a regulating circuit for maintaining the output voltage above said input voltage measured by said voltage detector by at least a constant voltage;

said control circuit comprising a comparator for comparing the reference voltage and DC output voltage to produce comparative outputs; and a drive signal generator for producing drive signals to a control terminal of the switching element based on the comparative outputs from said comparator.

5. The AC-DC converter of claim 4, wherein said regulating circuit comprises a regulating element connected to the output terminal of said voltage detector; a resistor and voltage dividing resistors connected between an output terminal of the booster circuit and earth; and an adjusting element connected in parallel to said resistor to supply outputs of said regulating element to a control terminal of said adjusting element.

6. The AC-DC converter of claim 1, further comprising biasing means for shifting the input voltage of the voltage detector to an elevated level to expand the ON period in an ON-OFF cycle of the switching element for elevation of the output voltage.

7. The AC-DC converter of claim 1, wherein said voltage detector discerns a peak of the input voltage.

8. The AC-DC converter of claim 1, further comprising an aligning circuit for maintaining the output voltage on a predetermined value shown by the following formula:

$$V_{OUT} = \{(R_{20}+R_{21}+R_{23})/R_{21}\} \cdot V_X$$

wherein $R_{20}$, $R_{21}$ and $R_{23}$ indicate resistance values of the resistors 20, 21 and 23, and $V_X$ indicates the value reference voltage of the potential means or the picked voltage of the regulating circuit.

9. The AC-DC converter of claim 1, further comprising a filter circuit connected to said AC power source; and a rectifying circuit connected to said filter circuit for supplying rectified DC output to said booster circuit and voltage detector.

10. The AC-DC converter of claim 2, further comprising biasing means for shifting the input voltage of the voltage detector to an elevated level to expand the ON period in an ON-OFF cycle of the switching element for elevation of the output voltage.

11. The AC-DC converter of claim 3, further comprising biasing means for shifting the input voltage of the voltage detector to an elevated level to expand the ON period in an ON-OFF cycle of the switching element for elevation of the output voltage.

12. The AC-DC converter of claim 4, further comprising biasing means for shifting the input voltage of the voltage detector to an elevated level to expand the ON period in an ON-OFF cycle of the switching element for elevation of the output voltage.

13. The AC-DC converter of claim 5, further comprising biasing means for shifting the input voltage of the voltage detector to an elevated level to expand the ON period in an ON-OFF cycle of the switching element for elevation of the output voltage.

* * * * *